United States Patent
Baird et al.

(10) Patent No.: US 9,886,288 B2
(45) Date of Patent: Feb. 6, 2018

(54) GUIDED EDIT OPTIMIZATION

(71) Applicant: Microsoft Technology Licensing, LLC, Redmond, WA (US)

(72) Inventors: Alexis Blevins Baird, San Francisco, CA (US); Lokesh P. Bajaj, Fremont, CA (US); Jason Schissel, Mountain View, CA (US); Xin Fu, Sunnyvale, CA (US); Nikita Igorevych Lytkin, Sunnyvale, CA (US); Yin Lou, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 14/835,605

(22) Filed: Aug. 25, 2015

(65) Prior Publication Data

US 2016/0055010 A1 Feb. 25, 2016

Related U.S. Application Data

(63) Continuation-in-part of application No. 14/319,521, filed on Jun. 30, 2014, now Pat. No. 9,253,226.

(51) Int. Cl.
*G06F 3/048* (2013.01)
*G06F 9/44* (2006.01)
(Continued)

(52) U.S. Cl.
CPC .......... *G06F 9/4446* (2013.01); *G06F 3/0481* (2013.01); *G06F 17/243* (2013.01);
(Continued)

(58) Field of Classification Search
CPC .... G06F 9/4446; G06F 3/0481; G06F 17/243; G06F 17/30867; H04L 65/403; G06Q 50/01
(Continued)

(56) References Cited

U.S. PATENT DOCUMENTS

| | | | |
|---|---|---|---|
| 8,990,191 B1 * | 3/2015 | Liu | G06F 17/30598 705/14.45 |
| 9,253,226 B2 | 2/2016 | Collins et al. | |

(Continued)

OTHER PUBLICATIONS

"U.S. Appl. No. 14/319,521, Examiner Interview Summary dated Apr. 29, 2015", 3 pgs.

(Continued)

*Primary Examiner* — David Phantana-angkool
(74) *Attorney, Agent, or Firm* — Schwegman Lundberg & Woessner, P.A.

(57) ABSTRACT

Techniques for optimizing a guided edit process for editing a member profile page are described. According to various embodiments, incomplete member profile fields in a member profile associated with member of an online social networking service are identified. Profile completion score weight values associated with the incomplete member profile fields in the member profile are then determined. Thereafter, the incomplete member profile fields in the member profile are ranked, based on the profile completion score weight values associated with each of the incomplete member profile fields. A list of one or more of the highest ranked incomplete member profile fields are then displayed, together with a prompt recommending the member to complete the identified incomplete member profile fields.

20 Claims, 16 Drawing Sheets

(51) Int. Cl.
*G06F 17/24* (2006.01)
*G06F 17/30* (2006.01)
*G06F 3/0481* (2013.01)
*H04L 29/06* (2006.01)
*G06Q 50/00* (2012.01)

(52) U.S. Cl.
CPC ...... *G06F 17/30867* (2013.01); *H04L 65/403* (2013.01); *G06Q 50/01* (2013.01)

(58) Field of Classification Search
USPC ......................................................... 715/753
See application file for complete search history.

(56) References Cited

U.S. PATENT DOCUMENTS

| | | | | |
|---|---|---|---|---|
| 9,418,119 | B2* | 8/2016 | Liu | G06F 17/30598 |
| 9,536,221 | B2* | 1/2017 | Frind | G06F 17/30867 |
| 9,736,253 | B2* | 8/2017 | Sullivan | H04L 67/22 |
| 9,800,993 | B2* | 10/2017 | Lee | H04W 4/001 |
| 2006/0047725 | A1* | 3/2006 | Bramson | G06F 21/604 |
| 2010/0077327 | A1 | 3/2010 | Pulsipher et al. | |
| 2013/0204966 | A1 | 8/2013 | Lee et al. | |
| 2014/0031130 | A1 | 1/2014 | Janakiraman et al. | |
| 2014/0074653 | A1 | 3/2014 | Wang et al. | |
| 2014/0136933 | A1* | 5/2014 | Berger | G06Q 50/01 715/202 |
| 2014/0137004 | A1 | 5/2014 | Berger et al. | |
| 2014/0143325 | A1 | 5/2014 | Lessin et al. | |
| 2015/0381670 | A1 | 12/2015 | Jain et al. | |
| 2016/0055010 | A1* | 2/2016 | Baird | G06F 9/4446 707/727 |
| 2016/0132190 | A1 | 5/2016 | Jain et al. | |
| 2017/0063740 | A1* | 3/2017 | Schissel | H04L 51/046 |

OTHER PUBLICATIONS

"U.S. Appl. No. 14/319,521, Examiner interview Summary dated Dec. 4, 2014", 3 pgs.
"U.S. Appl. No. 14/319,521, Final Office Action dated Jan. 14, 2015", 13 pgs.
"U.S. Appl. No. 14/319,521, Non Final Office Action dated Sep. 11, 2014", 12 pgs.
"U.S. Appl. No. 14/319,521, Notice of Allowance dated Sep. 28, 2015", 11 pgs.
"U.S. Appl. No. 14/319,521, Response filed May 13, 2015 to Final Office Action dated Jan. 14, 2015", 11 pgs.
"U.S. Appl. No. 14/319,521, Response filed Dec. 11, 2014 to Non Final Office Action dated Sep. 11, 2014", 12 pgs.
"U.S. Appl. No. 14/997,384, Preliminary Amendment filed Feb. 9, 2016", 8 pgs.
"U.S. Appl. No. 14/997,384, Non Final Office Action dated Aug. 10, 2017", 12 pgs.
U.S. Appl. No. 14/997,384, filed Jan. 15, 2016, Guided Edit Optimization.
U.S. Appl. No. 14/319,521, filed Jun. 30, 2014, Guided Edit Optimization.

* cited by examiner

| MEMBER PROFILE FIELD | MEMBER SEGMENT | LIKELIHOOD VALUE |
|---|---|---|
| Position1 | Segment A<br>Segment B<br>Segment C<br>... | 0.5<br>0.9<br>0.3<br>... |
| Patent | Segment A<br>Segment B<br>Segment C<br>... | 0.4<br>0.1<br>0.5<br>... |
| Industry | Segment A<br>Segment B<br>Segment C<br>... | 0.8<br>0.7<br>0.2<br>... |
| ... | ... | ... |

*FIG. 6*

| MEMBER PROFILE FIELD | WEIGHT |
|---|---|
| Position1 | 17 |
| Patent | 16 |
| Industry | 10 |
| Skill | 9 |
| Picture | 5 |
| Edu1 | 6 |
| Publication | ... |
| Location | ... |
| Position3 | ... |
| Position2 | ... |

*FIG. 8*

GUIDED EDIT OPTIMIZATION

RELATED APPLICATION

The present application is a continuation-in-part of U.S. application Ser. No. 14/319,521, filed Jun. 30, 2014, the content of which is incorporated by reference herein in its entirety.

TECHNICAL FIELD

The present application relates generally to data processing systems and, in one specific example, to improved techniques for optimizing a guided edit process for editing a member profile page.

BACKGROUND

Online social networking services such as LinkedIn® are becoming increasingly popular, with many such websites boasting millions of active members. Each member of the online social networking service is able to upload an editable member profile page to the online social networking service. The member profile page may include various information about the member, such as the member's biographical information, photographs of the member, and information describing the member's employment history, education history, skills, experience, activities, and the like. Such member profile pages of the networking website are viewable by, for example, other members of the online social networking service.

BRIEF DESCRIPTION OF THE DRAWINGS

Some embodiments are illustrated by way of example and not limitation in the figures of the accompanying drawings in which:

FIG. 6 illustrates an example of likelihood information, according to various embodiments;

FIG. 8 illustrates an example of profile completion score criteria information, according to various embodiments;

DETAILED DESCRIPTION

Example methods and systems for optimizing a guided edit process for editing a member profile page are described. In the following description, for purposes of explanation, numerous specific details are set forth in order to provide a thorough understanding of example embodiments. It will be evident, however, to one skilled in the art that the present invention may be practiced without these specific details.

Briefly, an existing guided profile edit feature of the online social networking service LinkedIn® prompts members to perform profile edit tasks in connection with their member profile (such as adding photos or information to their profile). Currently, there is a predetermined order of profile edit tasks which are displayed to every member. Moreover, a particular profile edit task is repeatedly displayed to the member, until that member either completes or skips that profile edit task. Various techniques described herein dynamically optimize the order in which profile edit tasks are displayed to a member, in order to maximize the efficient completion of profile edit tasks by the member.

Figure 1:
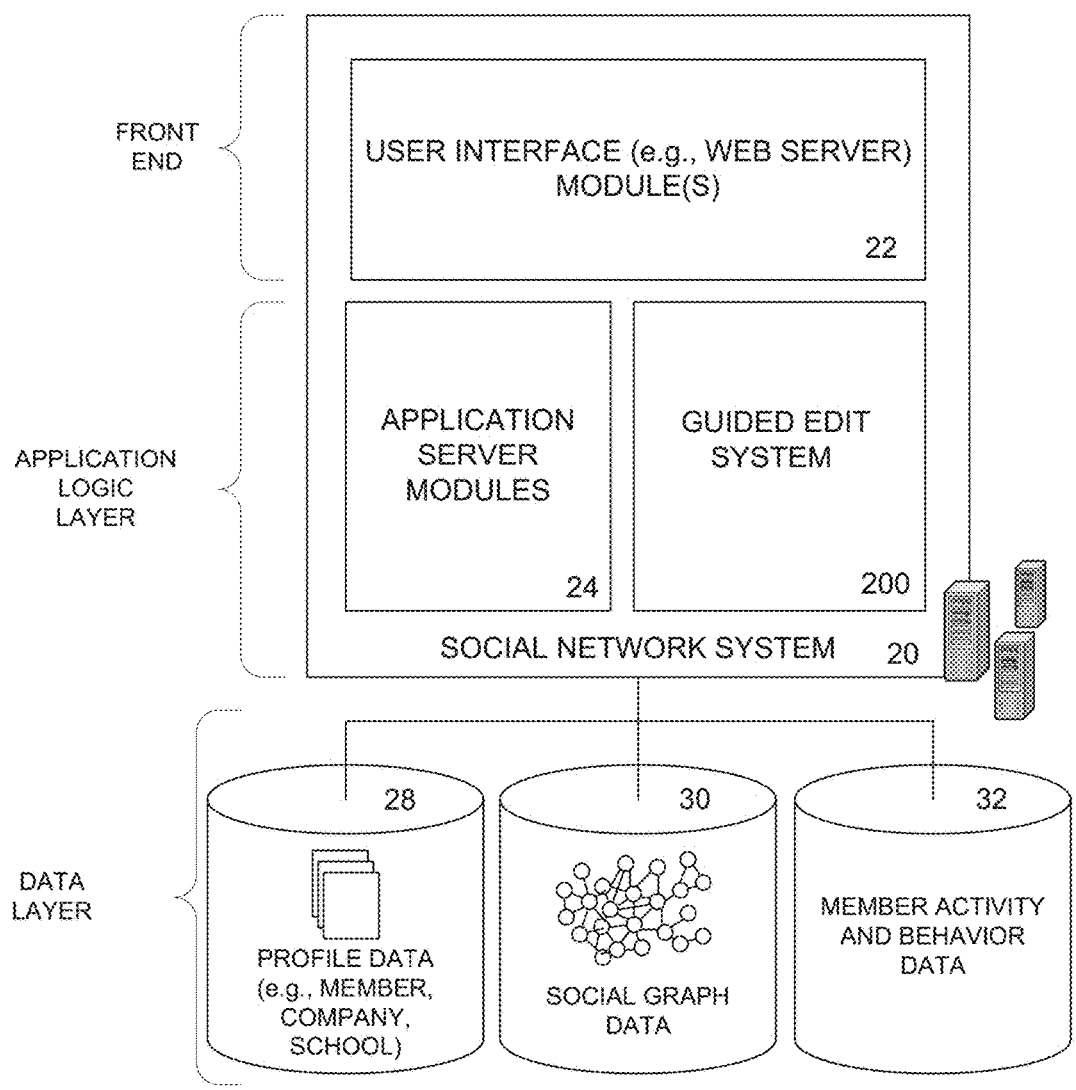
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an improved guided editing system 200. The 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
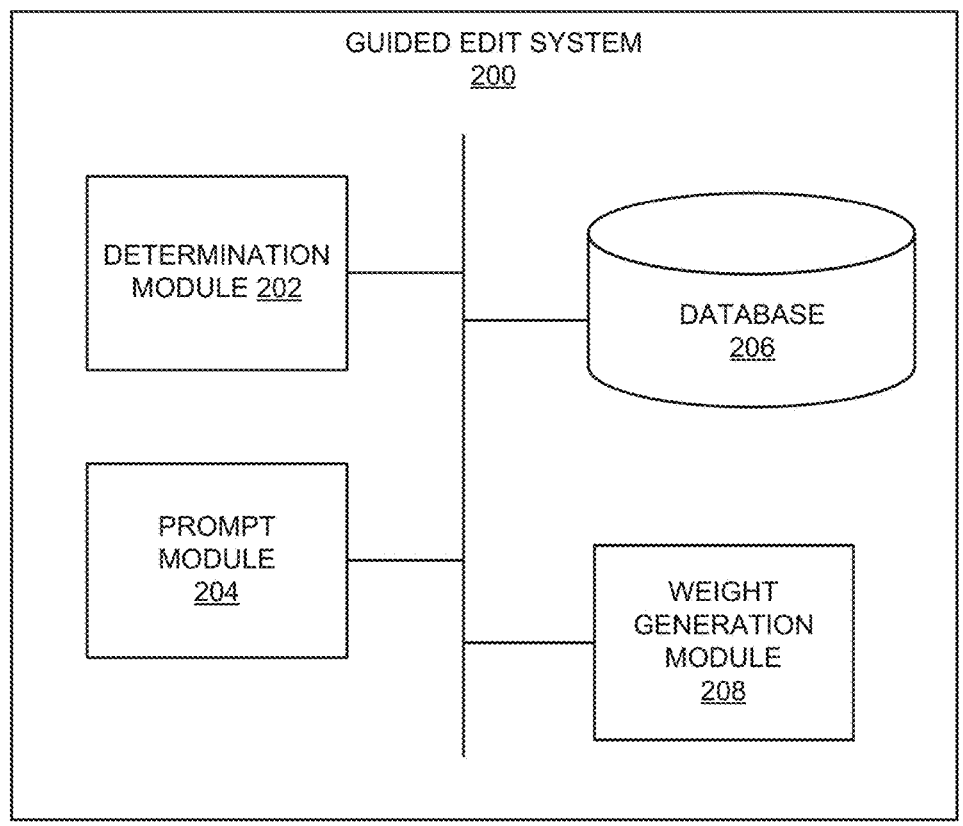
FIG. 2 is a block diagram of an example system, according to various embodiments.

Turning now to FIG. 2, a guided edit system 200 includes a determination module 202, a prompt module 204, a database 206, and a weight generation module 208. The modules of the guided edit system 200 may be implemented on or executed by a single device such as a guided edit device, or on separate devices interconnected via a network. The aforementioned guided edit device may be, for example, one or more client machines or application servers. The operation of each of the aforementioned modules of the guided edit system 200 will now be described in greater detail below.

Figure 3:
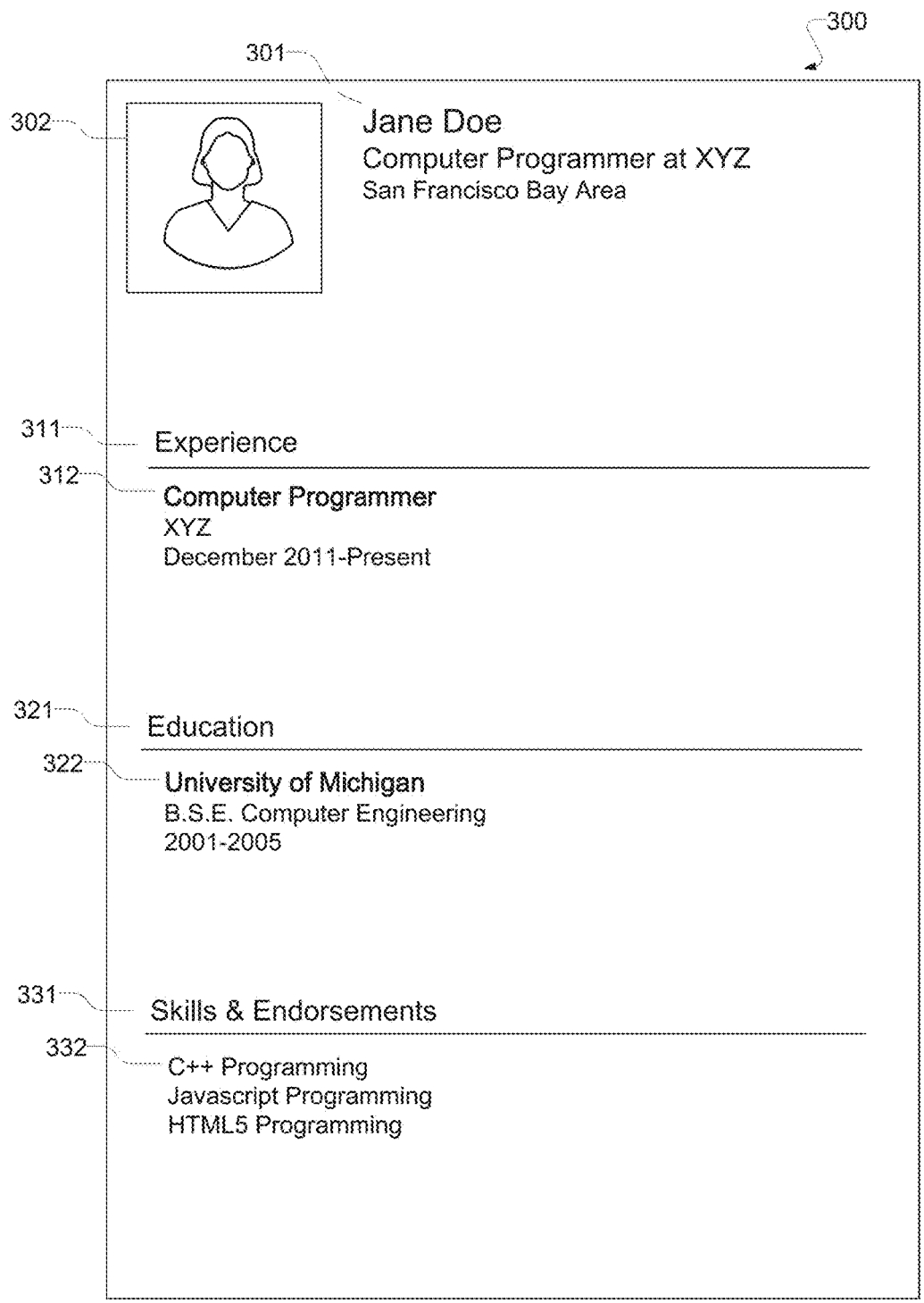
FIG. 3 illustrates an example portion of a member profile page, according to various embodiments.

Generally, each member of an online social networking service (such as LinkedIn®) has a member profile page that includes various information about that member. An example member profile page 300 of an example member "Jane Doe" is illustrated in FIG. 3. As seen in FIG. 3, the member profile page 300 includes identification information 301, such as the member's name ("Jane Doe"), member's current position, ("Computer Programmer at XYZ"), and geographic address/location information ("San Francisco Bay Area"). The member's profile page 300 also includes a photo area 302 for displaying a photograph of the member. Further, the member profile page 300 includes various sections (also known as fields). For example, member profile page 300 includes an experience section 311 including listings of past or present experience positions of the member (e.g., employment/volunteer experience position 312), an education section 321 including listings of past or present educational credentials of the member (e.g., university degree or diploma 322 earned or currently being earned by the member), and a skills & endorsements section 331 including listings of various skills of the member and endorsements of those skill listings by other members. Member profile page 300 is merely exemplary, and while the member profile page 300 includes certain sections (e.g., experience sections and education sections), these sections or fields may be supplemented or replaced by other sections or fields (e.g., a general portfolio section/field, an art portfolio section/field, a music portfolio section/field, a photography portfolio section/field, a multimedia section/field, a volunteer section/field, and so forth). A member profile page may include other information, such as various identification information (name, username, social media handle, email address, geographic address, networks, location, phone number, fax number, etc.), past or present education information, past or present employment information, past or present volunteer information, resume information, skills, endorsements, recommendations, title, industry, company size, seniority level, activities, group membership, images, photos, preferences, news, status, links or URLs on the profile page, and so forth.

Figure 4:
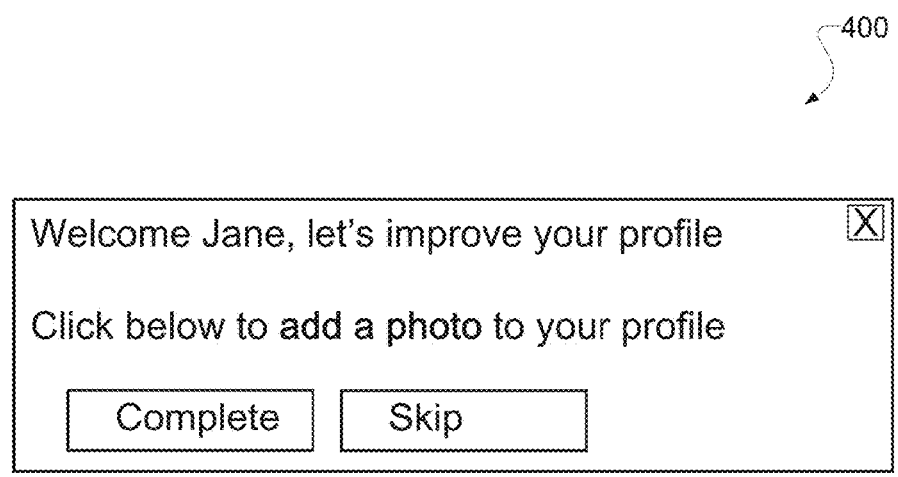
FIG. 4 illustrates an example portion of a prompt for a profile edit task, according to various embodiments.

It is often challenging for members to update the information on their profile or otherwise make their profile as complete as possible. Accordingly, social network services such as LinkedIn® include a "guided profile edit" or "guided edit" feature that assists members in editing profile pages by performing various profile edit tasks. For example, the system may maintain a list of profile edit tasks that need to be performed in order to complete a member profile page (e.g., add title, add photo, add employment history, add education history, add skills, add profile summary, add any other attributes described above in conjunction with FIG. 3, etc.). Thereafter, a guided edit system may display prompts (e.g., see prompt 400 in FIG. 4) associated with each outstanding profile edit task in the list (that is, each profile edit task in the list that has not been completed). In some embodiments, the list of profile edit tasks may have a particular or fixed order. For example, this list of profile edit tasks may have a predetermined order that is defined manually. Accordingly, the guided edit system may display prompts associated with each outstanding profile edit task based on their order in the list. For example, if the list includes tasks A, B, C, and D, the system will prompt the member to perform task A until task A is performed or skipped, and then the system will prompt the member to perform task B, and so on. Thus, conventionally, if a profile edit task is outstanding and needs to be performed, the guided edit system will display this profile edit task repeatedly until the member finishes the task (e.g., by clicking on the "Complete" button illustrated in FIG. 4) or until the member affirmatively skips the task to proceed to the next task in the ordered list (e.g., by clicking on the "Skip" button illustrated in FIG. 4).

As described in various embodiments herein, the guided edit system 200 is configured to order or reorder the list of profile edit tasks for incomplete member profile fields in order to optimize the profile editing process for members. For example, in some embodiments, the guided edit system 200 may reorder the list of profile edit tasks based on a response metric associated with each profile edit task (or, put another way, each incomplete member profile field). An example of a response metric associated with a profile edit task is a click through rate or CTR (e.g., representing the amount of clicks on the "Complete" button in FIG. 4 in comparison to the number of impressions of the prompt 400). In some embodiments, the task with the highest CTR may be placed at the top of the re-ordered list, the task with the second highest CTR may be placed second in the list, and so on, and the system 200 may prompt the member to perform each task based on the updated ordering of the list. Thus, the guided edit system 200 may prompt the member to perform the task with the highest CTR first, and then once the member finishes or skips that task, the guided edit system 200 may prompt the member to perform the task with the next highest CTR, and so on. In some embodiments, the guided edit system 200 may prompt the member by displaying a prompt via a user interface on a client device, where the prompt invites the member to update their member profile page by performing a specific profile edit task (e.g., see FIG. 4). In some embodiments, the guided edit system 200 may prompt the member by transmitting a message to the member that invites the member to update their member profile page by performing a specific profile edit task. In some examples, the message may be an email, a text message (e.g., short message service (SMS) message or multimedia messaging service (MMS) message), a social network instant message, a chat message, etc.

Figure 5A:
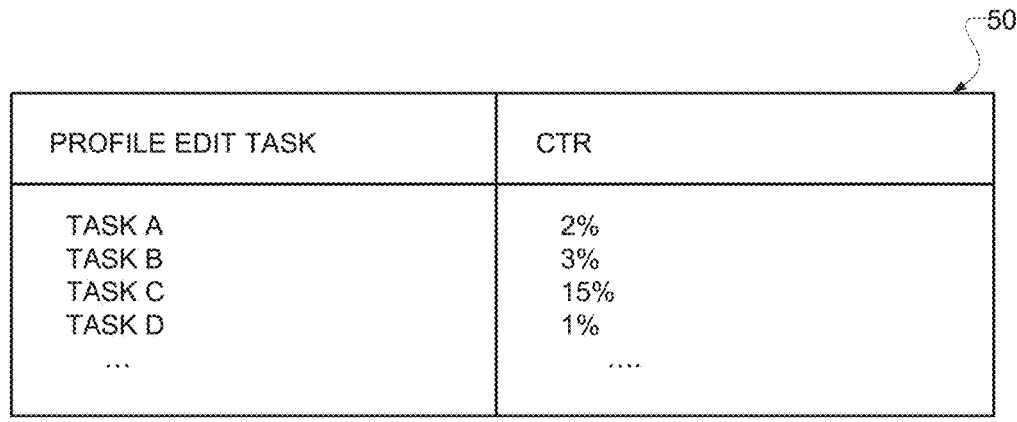
FIG. 5A illustrates an example of response metric information, according to various embodiments.

The system 200 may identify the response metrics associated with each task by accessing response metric information identifying a response metric value (e.g., CTR) associated with each of various tasks, such as response metric information 500 illustrated in FIG. 5A. Such response metric information may be stored locally at, for example, the database 206 illustrated in FIG. 2, or may be stored remotely at a database, data repository, storage server, etc., that is accessible by the guided edit system 200 via a network (e.g., the Internet). In some embodiments, the guided edit system 200 may generate the response metric information itself by accessing log history information (e.g., see database 32 in FIG. 1) identifying historical responses to profile edit task prompts by members of an online social networking service. In some embodiments, the response metrics described herein may correspond to any type of metric or measurement of how a member interacts with a prompt, or how a member performs a task. For example, the response metric may measure how many members actually complete a given profile edit task.

Figure 5B:
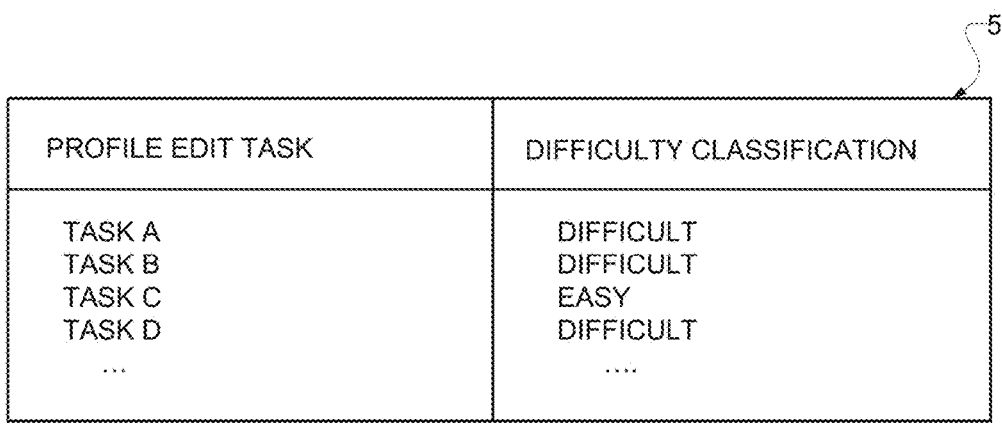
FIG. 5B illustrates an example of task difficulty information, according to various embodiments.

In some embodiments, the guided edit system 200 may infer the difficulty of a task and/or the likelihood that a member may complete a task, based on a response metric (e.g., CTR) associated with the task. Accordingly, the CTR associated with the task may correlate to (or serve as a proxy for) the difficulty of the task, with tasks having higher CTR and being correlated with easier or lightweight tasks and vice versa, and tasks having lower CTRs being correlated to more difficult or heavyweight tasks and vice versa. In some example embodiments, the system 200 may reorder a list of candidate profile edit tasks based on the difficulty of each task. For example, the guided edit system 200 may access task difficulty information identifying a difficulty classification associated with each of various tasks, such as the task difficulty information 501 illustrated in FIG. 5B. The difficulty classification associated with each task may be, for example, one of easy, medium, or hard, or one of lightweight and heavyweight, or a number within a predetermined range of numbers, (such as the range 0 to 1, 1 to 10, 1 to 100, etc.). In some embodiments, the guided edit system 200 may generate the task difficulty information 501, where the difficulty classification of each task may be determined based on the CTR or another response metric associated with that task (e.g., tasks with a CTR higher than a predetermined threshold may be classified as easy tasks, otherwise, they may be classified as difficult tasks), as described above. The difficulty classification associated with each task may also be determined in other ways, such as receiving user input regarding the difficulty of each task (e.g., via user responses to surveys or questionnaires, or from comments or questions received from users, etc.).

As described above, the guided edit system 200 may determine the likelihood that a member will complete a task, based on a likelihood value associated with the task (where the likelihood value may correspond to a historical response metric such as CTR in connection with a prompt to perform the profile edit task). For example, the historical response metric (e.g., historical CTR) for that task across all members of the online social networking service may be recorded (e.g., see FIG. 5A) and treated as the appropriate likelihood value. In some embodiments, the guided edit system 200 may instead utilize likelihood values and/or historical response metrics associated with different member segments. For example, FIG. 6 illustrates likelihood information 600 that identifies, for a given member profile field (e.g., Position1, Patent, Industry, etc.), likelihood values associated with different members segments (e.g., Segment A, Segment B, Segment C, etc.), where each likelihood value indicates a likelihood that a member in the given member segment will complete the given member profile field (e.g., in response to being presented with a prompt with a profile edit task of completing the member profile field). Accordingly, the guided edit system 200 may determine a member segment that a current member belongs to, access a segment-specific likelihood value associated with that member segment, and utilize that segment-specific likelihood value to determine the likelihood that the current member will complete the task. Thus, for the segment that the current member falls into, the segment-specific likelihood value for that segment indicates what kind of tasks they are most likely to complete. Accordingly, for a given member segment that a current member falls into, the guided edit system 200 may rank profile edit tasks based on segment-based likelihood values associated with each task, such that the task with the highest segment based likelihood value is ranked highest, the task with the second highest segment based likelihood value is ranked second highest, and so on. Thus, based on these segments, a different ordering of tasks can be show to the member.

In some embodiments, the member segments may correspond to members having different levels of experience with the site or different frequency of usage for the site. For example, the different member segments may correspond to more active users or power users versus less active or dormant users. As another example, the member segments may reflect historical log-in frequency, such as an inactive user (e.g., a member that accesses the site less than once a month on average), or a monthly user (e.g., a member that accesses the site once a month on average), a weekly user (e.g., a member that accesses the site once a week on average), a daily user (e.g., a member that accesses the site once a day on average), etc. In some embodiments, the member segments may reflect whether the member is a student or an employee. In other embodiments, the segmentation of the members may be performed based on the value of any member profile attribute of the member, such as location, role, industry, language, current job, employer/company, experience, skills, education, school, endorsements, seniority level, company size, connections, connection count, account level, title, activities, group membership, preferences, etc.

In some embodiments, the segment likelihood values may correspond to a historical response metric (e.g., CTR for the appropriate profile edit task) across all members in the given segment (e.g., as recorded during a given time interval such as the last 7 days, the last month, the last 6 months, etc.). In other embodiments, the guided edit system 200 may generate the historical response metric based on experiments performed on a small subset (e.g., 5 or 10%) of members in the relevant member segment. For example, the guided edit system 200 may display a given profile update task to a small subset (e.g., 5 or 10%) of the relevant member segment, and record the appropriate response metric (e.g., CTR) for the profile edit task.

In some embodiments, the guided edit system 200 may generate online or offline models of member behavior across a member base, in order to predict the likelihood that a given member will complete a given profile edit task (e.g., given the member's previous actions). For example, the guided edit system 200 may generate a machine learned model, such as a logistic regression model, configured to predict the likelihood or probability that a given member, with given member profile attributes and a known member behavior, will complete a given profile edit task. Such a model may be trained based on positive training data of other members that have or have not completed the profile edit task. For example, the positive training data may include feature vectors with feature data associated with each member of the online social networking service (or a large set of members, such as 10,000-1 million members), where the feature data indicates member profile data of the member (e.g., company, location, education, skills, etc.), completed profile edit tasks, and the context in which these profile edit tasks were completed (e.g., time when they completed the profile edit task, location, platform/channel such as via mobile, desktop, email, etc.). Similarly, the negative training data may include feature vectors with feature data associated with each member of the online social networking service (or a large set of members, such as 10,000-1 million members) that have not completed the profile edit task, where the feature data indicates member profile data of the member (e.g., company, location, education, skills, etc.), completed profile edit tasks, and the context in which these profile edit tasks were completed (e.g., time when they were presented with the profile edit task but did not complete the profile edit task, location, platform/channel such as via mobile, desktop, email, etc.). Accordingly, based on such training feature data, the coefficients of a logistic regression model may be trained to generate a trained machined learned model. Using this machine learned model, feature data of a new or current member may be input into the model in order to determine the probability that they will complete a profile edit task.

Thus, when a member logs into an online social networking service to view their member profile page, the system 200 may identify all profile edit tasks that the member needs to complete, calculate the likelihood or probability associated with each outstanding profiled edit task consistent with the embodiments described above, and rank each outstanding profile edit task based on the calculated likelihoods. The 200 may then display the highest ranked profile edit task, and once the member completes or skips this task, the guided edit system 200 may continue to display the other outstanding tasks in accordance with the ranked order. As an example scenario, the training data may indicate that when a member does not complete the "add patent" profile edit task, the chances of them completing the "add publications" profile edit tasks drops dramatically (e.g., below a predetermined threshold). Thus, if a member is shown an "add patent" profile edit task and the user indicates "not applicable" or "I don't have any patents", the machine learned model will indicate that it is not likely they have any publications, and the guided edit system 200 will not show the member the "add publications" profile edit task.

Figure 5C:
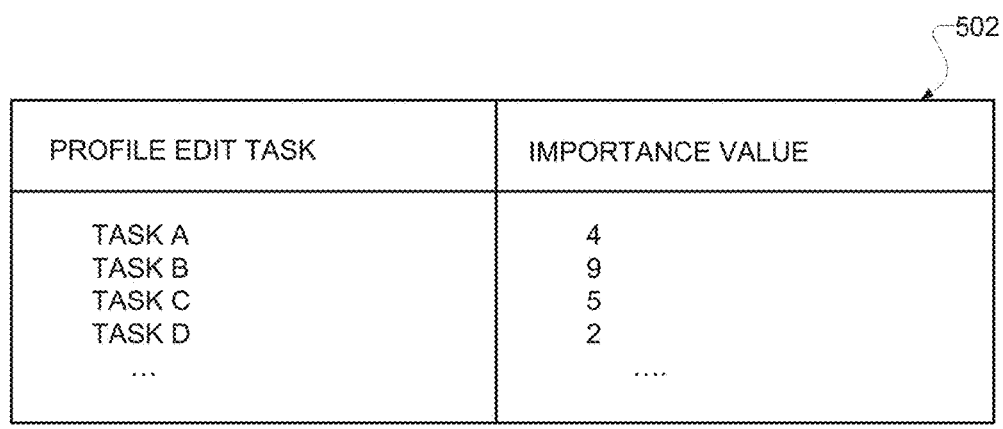
FIG. 5C illustrates an example of task importance information, according to various embodiments.

In some embodiments, the guided edit system 200 may reorder the list of profile edit tasks based on an importance value associated with each profile edit task. For example, the guided edit system 200 may access task importance information identifying importance values associated with each of various tasks, such as the task importance information 502 illustrated in FIG. 5C. The task importance information may be stored locally at, for example, the database 206 illustrated in FIG. 2, or may be stored remotely at a database, data repository, storage server, etc., that is accessible by the guided edit system 200 via a network (e.g., the Internet). In some embodiments, the task with the highest importance value may be placed at the top of the re-ordered list, the task with the second highest importance value may be placed second in the list, and so on, and the system 200 may prompt the member to perform each task based on the updated ordering of the list. Thus, the guided edit system 200 may prompt the member to perform the task with the highest importance value first, and then once the member finishes or skips that task, the guided edit system 200 may prompt the member to perform the task with the next highest importance value, and so on. The guided edit system 200 may display a user interface allowing a user of the guided edit system 200 (e.g., administrators or website personnel) to adjust the importance value associated with each of the profile edit tasks.

In some embodiments, the importance value may represent the importance or value of the completion of that task to the overall completeness, quality, value, impact, success, etc. of the member's profile. In other words, the importance value may represent the impact the performance of that task may have on a member's profile quality (e.g., in terms of an increase in profile views, member connections, messages received such as LinkedIn® InMails, and so on). For example, adding a photo may lead to a huge increase in profile views, whereas adding a skill may lead to a small increase in profile views. Thus, by placing tasks having a greater importance higher up in the list of profile edit tasks, people may receive more value sooner out of the guided edit process. In some embodiments, the importance value may represent the importance of the completion of that task from the business or financial perspective of a website or social network ecosystem. As one example, websites or social networks often serve advertisements and other content to members based on the current location of the member. Thus, the completion of a profile edit task whereby the member adds their location to their profile may be very important or valuable from a business perspective of a social network, notwithstanding its impact on profile views for the member profile. Thus, by placing tasks having a greater importance higher up in the list of profile edit tasks, websites or social networks may receive greater business benefits out of the guided edit process. The guided edit system 200 may display a user interface allowing a user of the guided edit system 200 (e.g., administrators or website personnel) to adjust the importance value associated with each of the profile edit tasks.

In some embodiments, the guided edit system 200 may reorder a list of profile edit tasks based on any combination of response metrics, difficulty classifications, or importance values associated with each profile edit task. The guided edit system 200 may display a user interface allowing a user of the guided edit system 200 (e.g., administrators or website personnel) to adjust weights associated with each of the factors (response metrics, importance values, etc.) that can be utilized for ranking the list of profile edit tasks.

Figure 7:
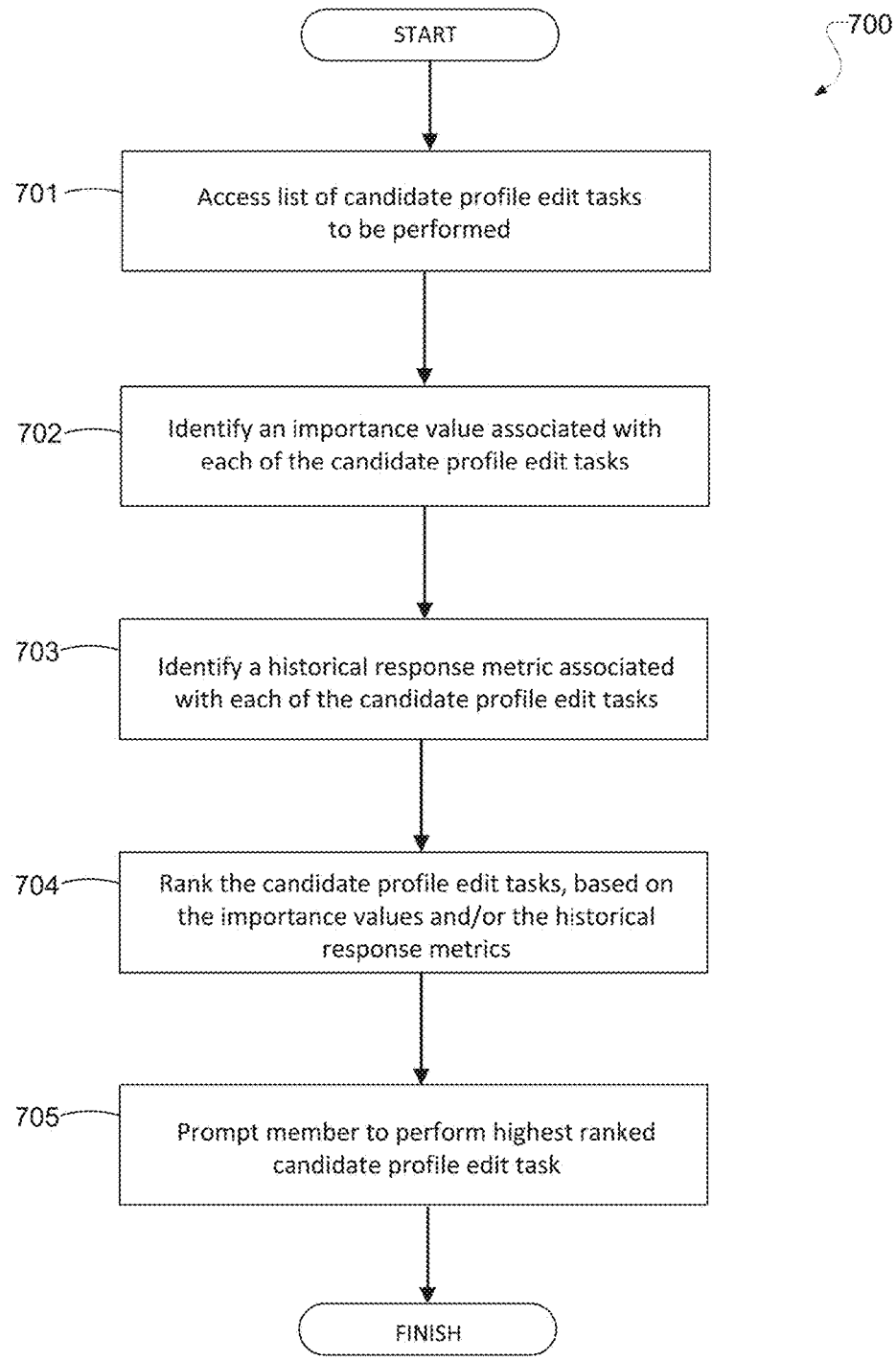
FIG. 7 is a flowchart illustrating an example method, according to various embodiments.

FIG. 7 is a flowchart illustrating an example method 700, consistent with various embodiments described above. The method 700 may be performed at least in part by, for example, the guided edit system 200 illustrated in FIG. 2 (or an apparatus having similar modules, such as one or more client machines or application servers). In operation 701, the determination module 202 accesses profile edit task information associated with a member of an online social networking service, the profile edit task information identifying a list of one or more candidate profile edit tasks to be performed to update a member profile page of the member. In some embodiments, the list may be edited to remove candidate profile edit tasks that have already been performed by the member. In operation 702, the determination module 202 identifies an importance value associated with each of the candidate profile edit tasks in the list accessed in operation 701. In operation 703, the determination module 202 identifies an historical response metric value (e.g., CTR) associated with each of the candidate profile edit tasks in the list accessed in operation 701. In operation 704, the determination module 202 ranks each of the candidate profile edit tasks, based on the importance values accessed in operation 702 and/or the historical response metrics accessed in operation 703. For example, the determination module 202 may rank, sort, filter, or order the list of candidate profile edit tasks based on a historical CTR for each task, with the task having the highest CTR being at the top of the list, and the task having the lowest CTR being at the bottom of the list. As another example, the determination module 202 may rank, sort, filter, or order the list of candidate profile edit tasks based on the importance of each task (as indicated by an importance value associated with each task), with the task having the highest importance being at the top of the list, and the task having the lowest importance being at the bottom of the list. In operation 705, the prompt module 204 prompts the member to perform the highest ranked candidate profile edit task in the list, based on the ranking performed in operation 704. It is contemplated that the operations of method 700 may incorporate any of the other features disclosed herein. Various operations in the method 700 may be omitted or rearranged, as necessary. For example, operation 702 or operation 703 may be omitted.

According to various example embodiments, the importance value described above may correspond to a profile completion score weight value for each member profile field that indicates the projected value that the member would receive from the completion of that field. In some embodiments, the system 200 is configured to determine the profile completion score weight value associated with each member profile field available in a member profile. For example, completion of the "patent" profile field may be worth 16 points, completion of the "profile picture" field may be worth 5 points, and so on. In some embodiments, the weight values associated with each member profile field indicates the value that a member receives based on the completed member profile field (e.g., in terms of profile views received, messages received, connection invitations received, prominence in search results, etc.). In particular, a profile completion score weight value for a given member profile second indicates, all else being equal, what is the difference in value that member receives if they have that field versus if they don't have that field. Thus, suppose that two profiles are the same except one has a profile picture and the other doesn't have a profile picture; the profile completion score weight value for the profile picture field will indicate the difference in value due to having the profile picture versus not having the profile picture. In some alternative embodiments, the profile completion score weight values associated with each member profile field instead (or in addition) indicates the value that the greater social network ecosystem receives (e.g., in terms of total page views on site, total ad clicks on site, etc.), based on having the completed member profile field.

In some embodiments, the profile completion score weights for the member profile fields may be used to suggest which fields a member should prioritize completing. For example, if a member has not completed 10 fields, a system may suggest that the member complete the missing field with the highest profile completion score weight value, rather than suggest that the member complete all 10 missing fields. Accordingly, the system described herein provides members with recommendations for fields to complete, which reduces the need for every member to attempt to complete every missing field in their member profile. This may result in a reduction in the processing power and network bandwidth demands placed on online social networking service hardware and software infrastructure.

FIG. 8 illustrates example profile completion score criteria information 800 identifying various member profile fields (e.g., "Position1", "Patent", "Industry", etc.), and a profile completion score weight value associated with each member profile field (e.g., "17", "16", "10", etc.). The profile completion score criteria information 800 may be stored in a database or data storage device (e.g., database 206 illustrated in FIG. 2). As illustrated in FIG. 8, there may be more than one position field (e.g., Position1, Position2, Position3, etc.) and more than one education field (e.g., Edu1, Edu2, Edu3, etc.), where Position1 may correspond to a current or most recent position (e.g., current job) and Edu1 may correspond to a current or most recent educational credential (e.g., university degree). Thus, a weight may be associated with each of these positions (e.g., Position1, Position2, Position3, etc.) and each education field (e.g., Edu1, Edu2, Edu3, etc.), consistent with the embodiments described herein. In other embodiments, member profiles may only include a single position field and/or a single education field. The fields in FIG. 8 are merely exemplary, and the techniques described herein may be applied to other fields, such as certifications, treasury, honors, summary, projects, organization, courses, tests, volunteer positions, position description, etc.

In some embodiments, each profile completion score weight value associated with each member profile field indicates a relative predicted effect on an outcome metric as result of completing the respective member profile field in comparison to not completing the respective member profile field. For example, the outcome metric may correspond to a quantity of profile views received, a prominence of a member profile in search results, a quantity of messages received via a member profile, or a quantity of connection invitations received via a member profile. In some embodiments, the outcome metric may correspond to a profile value score associated with a member or their member profile, where the profile value score is a score that represents the degree to which the member has received opportunities. Profile value scores are described in detail in pending U.S. patent application Ser. No. 14/815,835, filed Jul. 31, 2015, which is incorporated herein by reference. Thus, each profile completion score weight value associated with each member profile field may reflect a value to the member in completing the respective member profile field in comparison to not completing the respective member profile field. Instead or in addition, the outcome metric may correspond to a total quantity of page views performed at the online social networking service, or a total quantity of advertisement clicks performed at the online social networking service. Thus, each profile completion score weight value associated with each member profile fields may reflect a value to the greater online social networking ecosystem in completing the respective member profile field in comparison to not completing the respective member profile field.

In some embodiments, the weight generation module 204 is configured to determine the profile completion score weight values, based on analyzing coefficients associated with a final machine learned model. For example, the final machine learned model may correspond to a function including a series of variables corresponding to various member profile fields and coefficients associated with each of the variables, and the coefficient for a variable associated with a member profile field may be classified as the profile completion score weight for that corresponding member profile field.

The final machine learned model described above may be generated in accordance with the method 600. In particular, the final model may correspond to the average of several trained outcome-specific machine learned models each configured to predict the value of a specific outcome metric associated with a given member profile, based on the completion status (complete or incomplete) of the member profile fields of that profile.

The weight generation module 204 may train each of the outcome-specific models to predict the value of a specific outcome metric based on training data indicating, for each of a large number of members, known values of the outcome metrics and the completion status of various member profile fields. For example, feature data associated with a large number of members (e.g., 1 million members) may be accessed, where the feature data for each member may be stored in a feature vector, such as [0, 1, 0, 1, 0 . . . 0, 0, 1, 1, 437]. For example, each feature in the feature vector (other than the last feature) may correspond to a member profile field, where a 1 stored in the corresponding position in the feature vector indicates that member profile field is completed, and a 0 stored in the corresponding position feature vector indicates that the member profile field is not completed. The last feature in each feature vector may include a value of the relevant outcome metric, such as profile views for that profile (e.g., 457 views, etc.). Based on these feature vectors, a machine learning model (such as a linear regression model) may be trained to predict the value of the specific outcome metric associated with a given member profile, based on the completion status of the member profile fields in that profile. The weight generation module 204 may repeat this process for each outcome metric, in order to generate a number of outcome-specific machine learned models, such as a model for predicting the value of the outcome metric of quantity of messages received, a model for predicting the value of the outcome metric of total quantity of advertisement clicks performed at the online social networking service, and so on. Finally, all of the outcome-specific machine learned models may be averaged and normalized to generate a single final machine learned model.

In some embodiments, the different outcome-specific machine learned models may be weighted differently before being averaged to generate the single final machine learned model (e.g., to reflect that a particular outcome metric is more important by weighting the model for that outcome metric more greatly). It is understood that any combination or number of outcome-specific machine learned models may be utilized to generate the final machine learned models. For example, in some embodiments, only models for the outcome metrics that represent value to members (e.g., a quantity of profile views received, a prominence of a member profile in search results, a quantity of messages received via a member profile, and a quantity of connection invitations received via a member profile) are averaged to generate the final machine learned model. Alternatively, in some embodiments, only models for the outcome metrics that represent value to the greater social networking ecosystem (e.g., a total quantity of page views performed at the online social networking service and a total quantity of advertisement clicks performed at the online social networking service) are averaged to generate the final machine learned model.

Figure 9:
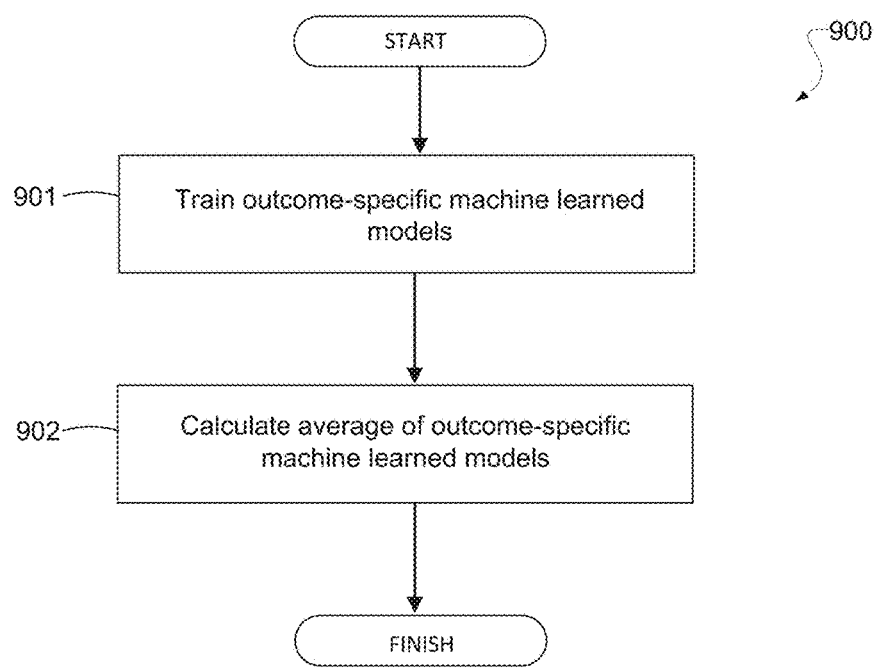
FIG. 9 is a flowchart illustrating an example method, according to various embodiments.

FIG. 9 is a flowchart illustrating an example method 900, consistent with various embodiments described herein. The method 900 may be performed at least in part by, for example, the improved guided editing system 200 illustrated in FIG. 2 (or an apparatus having similar modules, such as one or more client machines or application servers). In operation 901, the weight generation module 208 trains, for each of a plurality of outcome metrics, an outcome-specific machine learned model configured to predict a value of the corresponding outcome metric based on a given completion status for each member profile field in a given member profile. For example, the weight generation module 208 may access a set of feature data associated with each of a plurality of members of the online social networking service, each set of feature data indicating a completion status for each of the plurality of member profile fields associated with the corresponding member and a value of the appropriate outcome metric. The weight generation module 208 may then train, based on the feature data, the corresponding outcome-specific machine learned model. The weight generation module 208 will perform this training process for each outcome-specific machine learned model. In operation 902, the weight generation module 208 calculates the average of the outcome-specific machine learned models trained in operation 901. It is contemplated that the operations of method 900 may incorporate any of the other features disclosed herein. Various operations in the method 900 may be omitted or rearranged.

Figure 10:
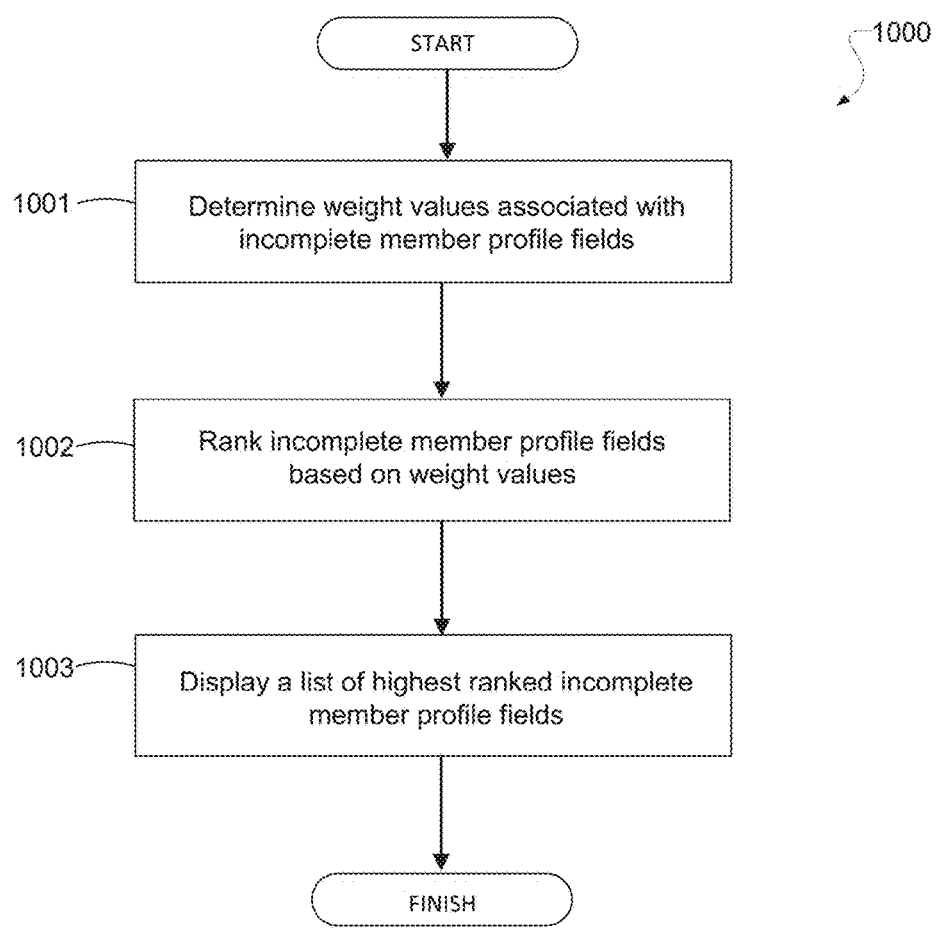
FIG. 10 is a flowchart illustrating an example method, according to various embodiments.

In some embodiments, weights for the member profile fields may be used to suggest which fields a member should prioritize completing. For example, if a member has not completed 10 fields, the system 200 may suggest that the member complete the missing field with the highest weight value, rather than suggest that the member complete all 10 missing fields. FIG. 10 is a flowchart illustrating an example method 1000, consistent with various embodiments described herein. The method 1000 may be performed at least in part by, for example, the improved guided editing system 200 illustrated in FIG. 2 (or an apparatus having similar modules, such as one or more client machines or application servers). In operation 1001, the determination module 202 determines, based on accessed profile completion score criteria information (e.g., see FIG. 5), the profile completion score weight values associated with incomplete member profile fields in a member profile. For example, the determination module may 202 access, from one or more databases, profile completion score criteria information identifying a profile completion score weight value associated with each member profile field available in member profiles of an online social networking service. In some embodiments, each profile completion score weight value indicates a relative measure of the value of that member profile field when it is completed. In some embodiments, the plurality of member profile fields includes a profile picture, a company section, an education section, a certification section, an honors section, a project section, a course section, a volunteer section, a skills section, an industry section, a location section, an awards section, a publication section, and a patent section. In operation 1002, the determination module 202 ranks the incomplete member profile fields in the member profile, based on the profile completion score weight values (that were determined in operation 1001) associated with each of the incomplete member profile fields. For example, the incomplete member profile fields with the higher profile completion score weight values may be ranked higher than the incomplete member profile fields with the lower profile completion score weight values. In operation 1003, the determination module 202 displays, via a user interface, a list of one or more of the highest ranked incomplete member profile fields (e.g., the top X fields) that were ranked in operation 1002, together with a prompt recommending the member to complete these identified incomplete member profile fields. Alternatively, the determination module 202 may display, via a user interface, the incomplete member profile fields with profile completion score weight values higher than a predetermined threshold, together with a prompt recommending the member to complete these identified incomplete member profile fields. It is contemplated that the operations of method 1000 may incorporate any of the other features disclosed herein. Various operations in the method 1000 may be omitted or rearranged.

In some example embodiments, instead of showing the same profile edit task to a member until he skips or completes the task, the system 200 may apply an "impression discounting" technique by moving on to the next task, if that member has viewed the same task prompt a number of times. The inventors have determined that the CTR of every task decreases exponentially with its number of impressions to a particular member. Accordingly, if the guided edit system 200 determines that a member has viewed a prompt inviting them to perform a specific profile edit task (e.g., see FIG. 4) a predetermined number of times (e.g., during a predetermined time interval), then the system 200 may avoid prompting that member to perform that profile edit task (e.g., for a predetermined time interval known as a cool-off period), and may begin prompting the member to perform another profile edit task (e.g., the next profile edit task in a list of candidate profile edit tasks). The guided edit system 200 may display a user interface allowing a user of the guided edit system 200 (e.g., administrators or website personnel) to adjust the aforementioned predetermined number and/or predetermined time interval (e.g., associated with all or each of the profile edit tasks). The guided edit system 200 may determine the prompts the member has already viewed by, for example, accessing log history information identifying content (e.g., profile edit task prompts) displayed to each member. Such log history information may be stored locally at, for example, the database 206 illustrated in FIG. 2, or may be stored remotely at a database, data repository, storage server, etc., that is accessible by the guided edit system 200 via a network (e.g., the Internet).

In some embodiments, the aforementioned log history information may include profile edit tasks previously displayed across different channels and platforms (e.g., desktop, mobile, email, etc.). Thus, if the user closes a profile edit task displayed on a mobile device, the guided edit system 200 ensures that this prompt will not be displayed if the member logs in via mobile device, desktop, email, etc., during the relevant cool off period. In some embodiments, different cool-off periods may be utilized depending on whether the profile edit task is presented to the member and they do not respond, in comparison to if the member indicates they are not interested in completing the profile edit task (e.g., by closing the entire profile edit task prompt) or if the member explicitly indicates that the profile edit task is not applicable to them (e.g., by clicking on a button in the prompt indicating "not applicable" or "no", such as a prompt stating "do you have any patents to add to your profile?").

Figure 11:
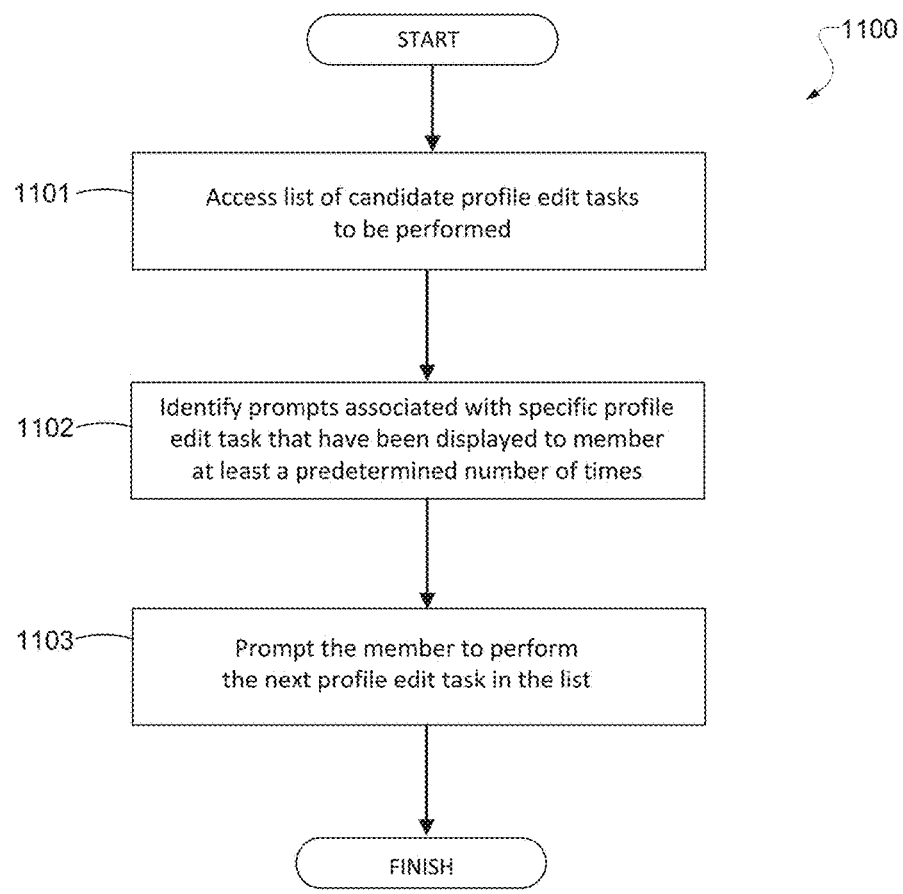
FIG. 11 is a flowchart illustrating an example method, according to various embodiments.

FIG. 11 is a flowchart illustrating an example method 1100, consistent with various embodiments described above.

The method 1100 may be performed at least in part by, for example, the guided edit system 200 illustrated in FIG. 2 (or an apparatus having similar modules, such as one or more client machines or application servers). In operation 1101, the determination module 202 accesses profile edit task information associated with a member of an online social networking service, the profile edit task information identifying a list of one or more candidate profile edit tasks to be performed to update a member profile page of the member. In some embodiments, the list may be edited to remove candidate profile edit tasks that have already been performed by the member. In operation 1102, the determination module 202 identifies prompts associated with a specific profile edit task (in the list accessed in operation 1101) that have been displayed to a member at least a predetermined number of times. For example, the prompts may have invited the member to update their member profile page by performing a specific profile edit task (e.g., see FIG. 4). In operation 1103, the prompt module 204 prompts the member to perform the next profile edit task in the list accessed in operation 1101 (e.g., the next task after the specific profile task identified in operation 1102). It is contemplated that the operations of method 1100 may incorporate any of the other features disclosed herein. Various operations in the method 1100 may be omitted or rearranged, as necessary.

In some embodiments, the guided edit system 200 may prioritize profile edit tasks for which inferred or suggested information is available, as these generally correspond to easy, lightweight tasks that do not require the user to manually enter a great deal of information. In addition (or instead), the guided edit system 200 may de-prioritize profile edit tasks for which inferred or suggested information is not available, as the user may be required to manually enter more information to complete these task. For example, supposes that a user's skills, company, or location may be inferred based on any techniques described in pending U.S. patent application Ser. No. 14/292,779, filed on May 30, 2014. Accordingly, the profile edit tasks of adding skills to profile, adding a company to a profile, or adding a location to a profile become relatively easy for the user, since the guided edit system 200 may display a prompt with the inferred data and request the user's permission to add it to their profile (e.g., a prompt stating "it looks like you work at LinkedIn—would you like to add this company to your profile?" with buttons labelled "yes" or "no", such that the member can complete the task simply by clicking on a "yes" button). Thus, this profile edit task may be prioritized ahead of another task for which inferred information is not available and thus may have greater user entry requirements for the user (e.g., a task such as filling in a position description, a summary description, etc.). This prioritization may occur notwithstanding the fact that the task for which inferred information is available may actually be less valuable or may otherwise be less likely to be completed, etc.

In some embodiments, before the guided edit system 200 may display a hook question or hook task (e.g., prior to displaying profile edit tasks to a user during their online session), where the hook question or hook task is designed to grab the user's attention to enter them into a profile edit flow. An example of a hook question or hook task is the display of a query such as "are you happy with your current job", or "are you happy with your current company", to which the user can response "yes", "no", "not sure", etc. Completion of the hook task not need not add value to the member's profile (as measured by a profile completion score weight values described herein), and need not even relate to adding information to their profile or completing a member profile field. Instead, once the user completes the hook question or hook task, they enter into the profile edit flow, and their completion rate for subsequently displayed profile edit tasks is much higher. In other words, once users have committed to starting to answer questions, they are more likely to actually answer additional questions or perform additional profile edit tasks, as they "warm up" to the profile edit flow. The 200 may display an user interface configured to enable a user of the guided edit system 200 (e.g., an administrator or personnel of an online social networking service) to specify the aforementioned hook question or hook task.

In some embodiments, the system 200 may dynamically determine the order of tasks based on the state of the profile of a member and recent profile update tasks performed by that member. For example, if a member has just completed a heavyweight task like editing their summary, then it is more likely that he is in a flow or mode of profile editing (also referred to herein as a profile edit session) and is therefore more likely to finish another heavyweight task like adding a photo. Accordingly, for such a member, the system 200 may prompt the member to perform another heavyweight task after he finishes the current heavyweight task. However, if a member has not recently completed a heavyweight task (e.g., even after the member has been prompted a number of times), the system 200 may follow up with a prompt for a lightweight task. The guided edit system 200 may determine the prompts the member has already viewed or the profile edit tasks the member has already performed by, for example, accessing log history information identifying content (e.g., profile edit task prompts) displayed to each member and profile edit tasks performed by each member. Such log history information may be stored locally at, for example, the database 206 illustrated in FIG. 2, or may be stored remotely at a database, data repository, storage server, etc., that is accessible by the guided edit system 200 via a network (e.g., the Internet).

Figure 12:
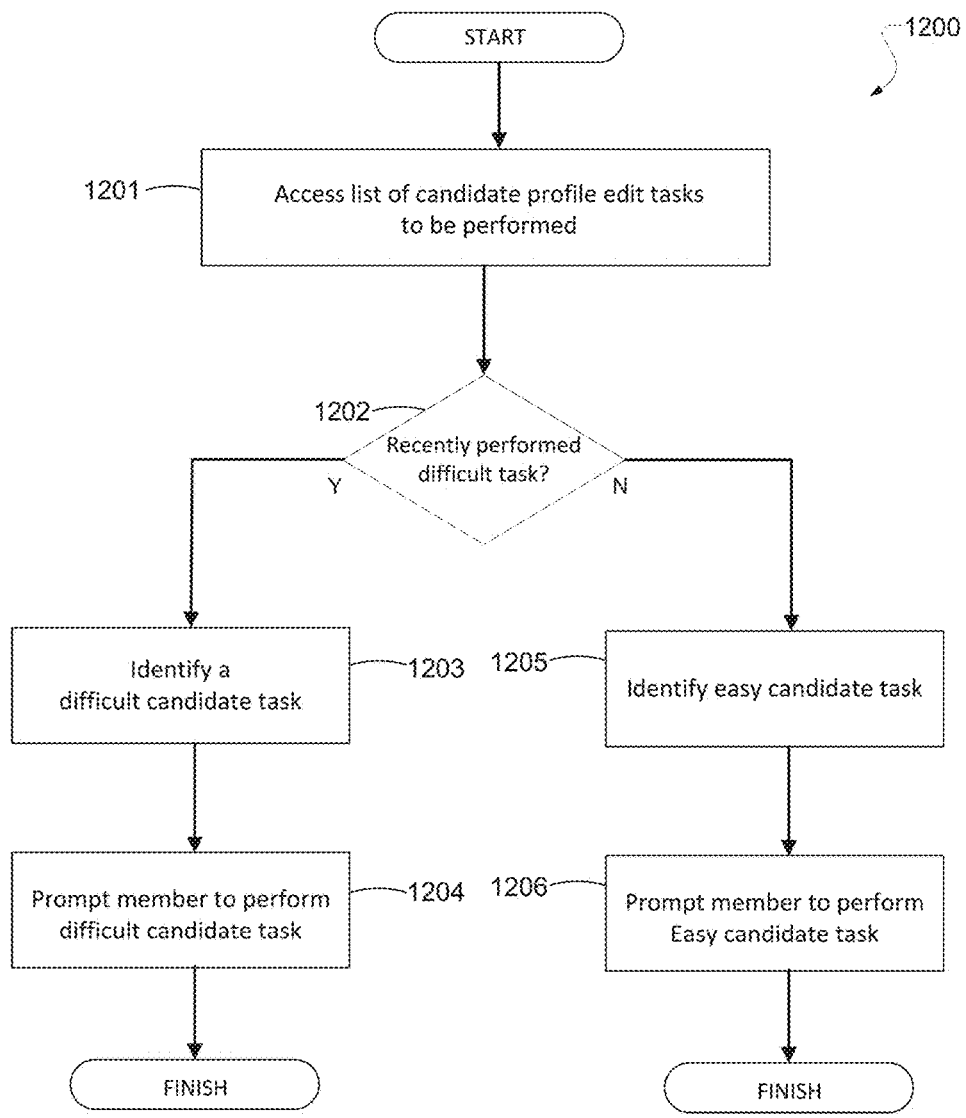
FIG. 12 is a flowchart illustrating an example method, according to various embodiments.

FIG. 12 is a flowchart illustrating an example method 1200, consistent with various embodiments described above. The method 1200 may be performed at least in part by, for example, the guided edit system 200 illustrated in FIG. 2 (or an apparatus having similar modules, such as one or more client machines or application servers). In operation 1201, the determination module 202 accesses profile edit task information associated with a member of an online social networking service, the profile edit task information identifying a list of one or more candidate profile edit tasks to be performed to update a member profile page of the member. In some embodiments, the list may be edited to remove candidate profile edit tasks that have already been performed by the member. In operation 1202, the determination module 202 determines whether the member recently completed a profile edit task classified as a difficult task (e.g., editing a profile summary of the member profile page). For example, the determination module 202 may access log data identifying user actions performed by the member, in order to determine which profile edit tasks have been performed recently (e.g., within a predetermined time interval, such as the last minute, last 30 minutes, last hour, etc.). The guided edit system 200 may display a user interface allowing a user of the guided edit system 200 (e.g., administrators or website personnel) to specified the aforementioned predetermined time interval. The determination module 202 may then access task difficulty information (e.g., see FIG. 5B) identifying a difficulty classification (e.g., difficult or easy) associated with various profile edit tasks. In some embodiments, the determination module 202 may determine that the member has not recently completed the profile edit task classified as a difficult task, based on determining that a predetermined number of prompts have been displayed to the member, the prompts inviting the member to perform the profile edit task classified as the difficult task.

Referring back to FIG. 12, if the determination module 202 determines that the member has recently performed a difficult profile edit task (1202, Yes), then in operation 1203, the determination module 202 identifies a specific one of the candidate profile edit tasks accessed in operation 1201 that is classified as a difficult task (e.g., adding a member photo to the member profile page). For example, the prompt module 204 may access task difficulty information (e.g., see FIG. 5B) identifying a difficulty classification (e.g., difficult or easy) associated with various profile edit tasks. In operation 1204, the prompt module 204 prompts the member to perform the specific profile edit task identified in operation 1203.

Referring back to FIG. 12, if the determination module 202 determines that the member has not recently performed a difficult profile edit task (1202, No), then in operation 1205, the determination module 202 identifies one of the candidate profile edit tasks accessed in operation 1201 that is classified as an easy task (e.g., adding a skill from a list of one or more suggested skills). For example, the prompt module 204 may access task difficulty information (e.g., see FIG. 5B) identifying a difficulty classification (e.g., difficult or easy) associated with various profile edit tasks. In operation 1206, the prompt module 204 prompts the member to perform the profile edit task identified in operation 1205. It is contemplated that the operations of method 1200 may incorporate any of the other features disclosed herein. Various operations in the method 1200 may be omitted or rearranged, as necessary.

As described above in conjunction with FIG. 12, if the member has recently completed a difficult task (1202, Yes), then the member may be presented with another difficult task. It is possible that this flow may continue for a long period of time (e.g., if there are a large number of difficult tasks to perform, and the member continues to perform them). In order to prevent the member being continuously confronted with difficult tasks, the system 200 may not automatically assign a difficult task to the member, but instead may introduce a lightweight task after the member completes the heavyweight task. For example, in some embodiments, if the member has performed a predetermined number of heavyweight tasks (e.g., within a predetermined time period), then a lightweight task may be presented thereafter, instead of a heavyweight task. The guided edit system 200 may display a user interface allowing a user of the guided edit system 200 (e.g., administrators or website personnel) to adjust the aforementioned predetermined number or predetermined time period. In some embodiments, if the member has recently completed a difficult task (1202, Yes), then the system 200 may select the next task randomly, with a 90% weighting towards difficult tasks and a 10% weighting towards easy tasks (in other words, there is a 90% chance that the member may be presented with a difficult task). Similarly, if the member has not recently completed a difficult task (1202, No), then the system 200 may select the next task randomly, with a 90% weighting towards the easy tasks and a 10% weighting towards the difficult tasks. The aforementioned percentages are merely exemplary, and the guided edit system 200 may display a user interface allowing a user of the guided edit system 200 (e.g., administrators or website personnel) to adjust the aforementioned percentages.

Figure 13:
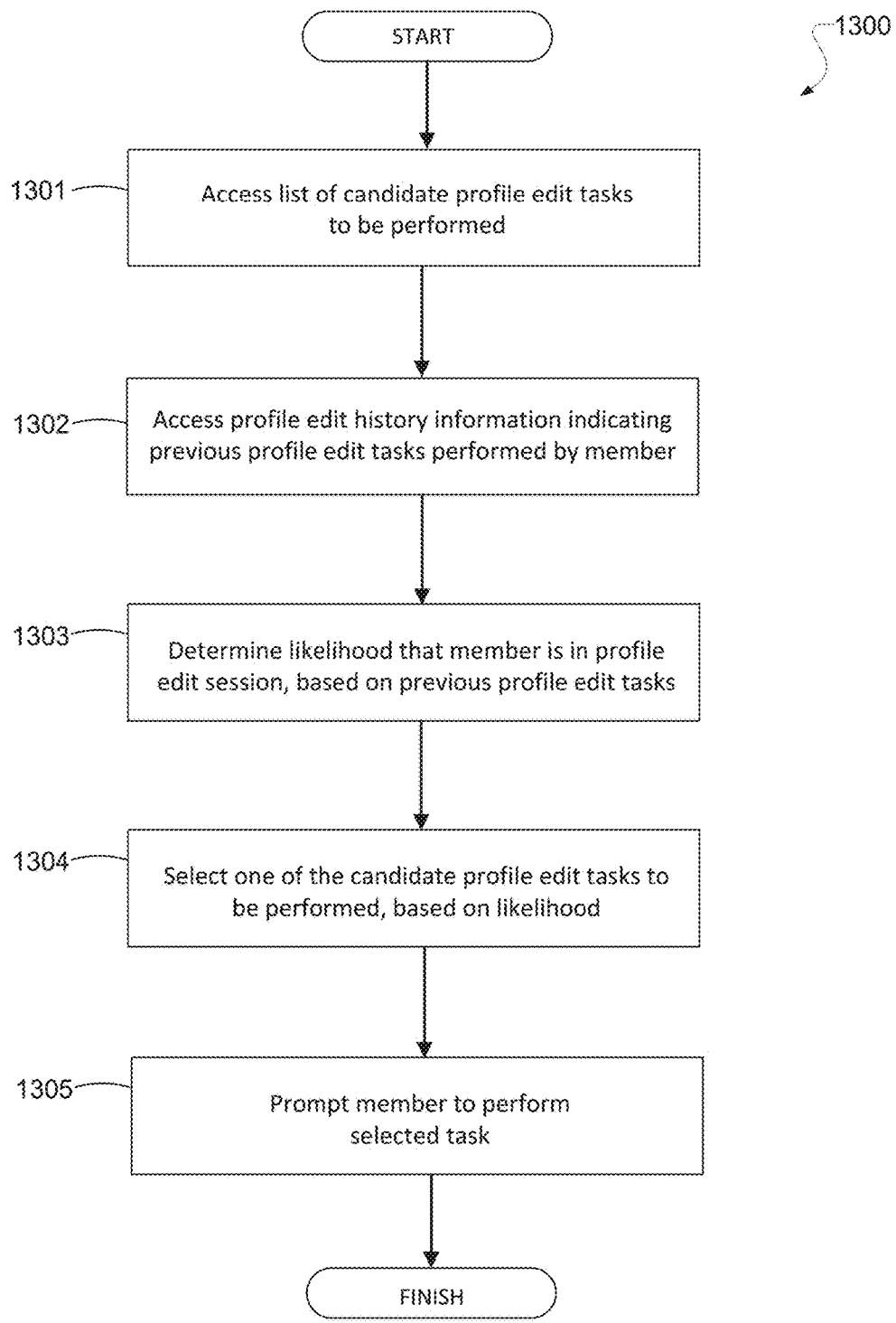
FIG. 13 is a flowchart illustrating an example method, according to various embodiments.

FIG. 13 is a flowchart illustrating an example method 1300, consistent with various embodiments described above. The method 1300 may be performed at least in part by, for example, the guided edit system 200 illustrated in FIG. 2 (or an apparatus having similar modules, such as one or more client machines or application servers). In operation 1301, the determination module 202 accesses profile edit task information associated with a member of an online social networking service, the profile edit task information identifying a list of one or more candidate profile edit tasks to be performed to update a member profile page of the member. In some embodiments, the list may be edited to remove candidate profile edit tasks that have already been performed by the member. In operation 1302, the determination module 202 accesses profile edit history information indicating previous profile edit tasks performed by the member. For example, the determination module 202 may access log data identifying user actions performed by the member, in order to determine which profile edit tasks have been performed recently (e.g., within a predetermined time interval, such as the last minute, last 30 minutes, last hour, etc.). In operation 1303, the determination module 202 determines the likelihood (e.g., probability) that member is in a profile edit session (also known as a profile edit flow or profile edit mode), based on previous profile edit tasks recently performed by the member. For example, if the profile edit history information accessed in operation 1302 indicates that the member recently performed a difficult profile edit task (e.g., editing a profile summary of the member profile page, or adding a member photo to the member profile page), then the determination module 202 may determine that it is more likely that the member is in a profile edit session. In operation 1304, the determination module 202 identifies a particular one of the profile edit tasks in the list accessed in operation 1301, based on the likelihood determined in operation 1303. For example, if the prompt module 204 determines that the member is likely in a profile edit session, the determination module 202 may identified a difficult task, whereas if the prompt module 204 determines that the member is likely not in a profile edit session, the determination module 202 may identified an easy task. In operation 1305, the prompt module 204 may then prompt the member to perform the task identified in operation 1304. It is contemplated that the operations of method 1300 may incorporate any of the other features disclosed herein. Various operations in the method 1300 may be omitted or rearranged, as necessary.

Various example embodiments described above may be combined. For example, the system 200 may order an existing list of candidate profile edit tasks (which may have a predetermined ordering, e.g., A, B, C, D, etc.) based on a response metric and/or an importance value associated with each of the candidate profile edits tasks, to generate a revised list (e.g., C, A, D, B). Thereafter, when displaying a particular candidate profile edit task to the member (e.g., C), if the system 200 determines that the member has viewed a predetermined number of prompts or invitations to perform that profile edit task, the system 200 may skip past that task and begin displaying prompts to perform that next task in the reordered list (e.g., A). The system 200 may avoid displaying the prompt for the skipped task (e.g., C) until the member has successfully performed all the other tasks per the reordered list (e.g., A, D, and B). Moreover, in some embodiments, if the system 200 determines that the member has just performed a very difficult task, the system 200 may disregard the current ordering of the list, and select another candidate profile edit task classified as a difficult task. The system 200 may repeat this until it determines that the member has not recently performed a difficult task, and then the system 200 may select an easy task to display to the member.

As another example, the guided edit system 200 may rank profile edit tasks (or, put another way, rank the incomplete member profile fields) based on a combination of the profile completion score weight values associated with each task/field (which, as described above, corresponds to an example of an importance value) and the segment-based likelihood values associated with each task/field. For example, in some embodiments, the guided edit system 200 may determine profile completion score weight values associated with each task/field (e.g., see FIG. 8), where the profile completion score weight values correspond to a number (e.g., 0-100). Thereafter, the guided edit system 200 may determine segment-based completion likelihood values associated with each task/field (e.g., see FIG. 6), where each segment-based likelihood value may correspond for a CTR of 0 to 1. The 200 may then multiply the profile completion score weight value of each task/field and the likelihood value (e.g., CTR) for each task/field, in order to generate a modified profile completion score weight value associated with each task/field. The tasks/fields may then be ranked based on the modified profile completion score weight values associated with each task/field. Moreover, the guided edit system 200 may also display the subset of the tasks for which inferred information is available (where they are displayed in order based on their profile completion score weight values or modified profile completion score weight values), before displaying tasks for which inferred information is not available (where they are display in order based on their profile completion score weight values or modified profile completion score weight values). Moreover, impression capping rules described herein may be utilized, such that a given task is skipped for the appropriate cool off period while the next appropriate task is displayed, and the given task is displayed again after the appropriate cool off period has expired.

Figure 14:
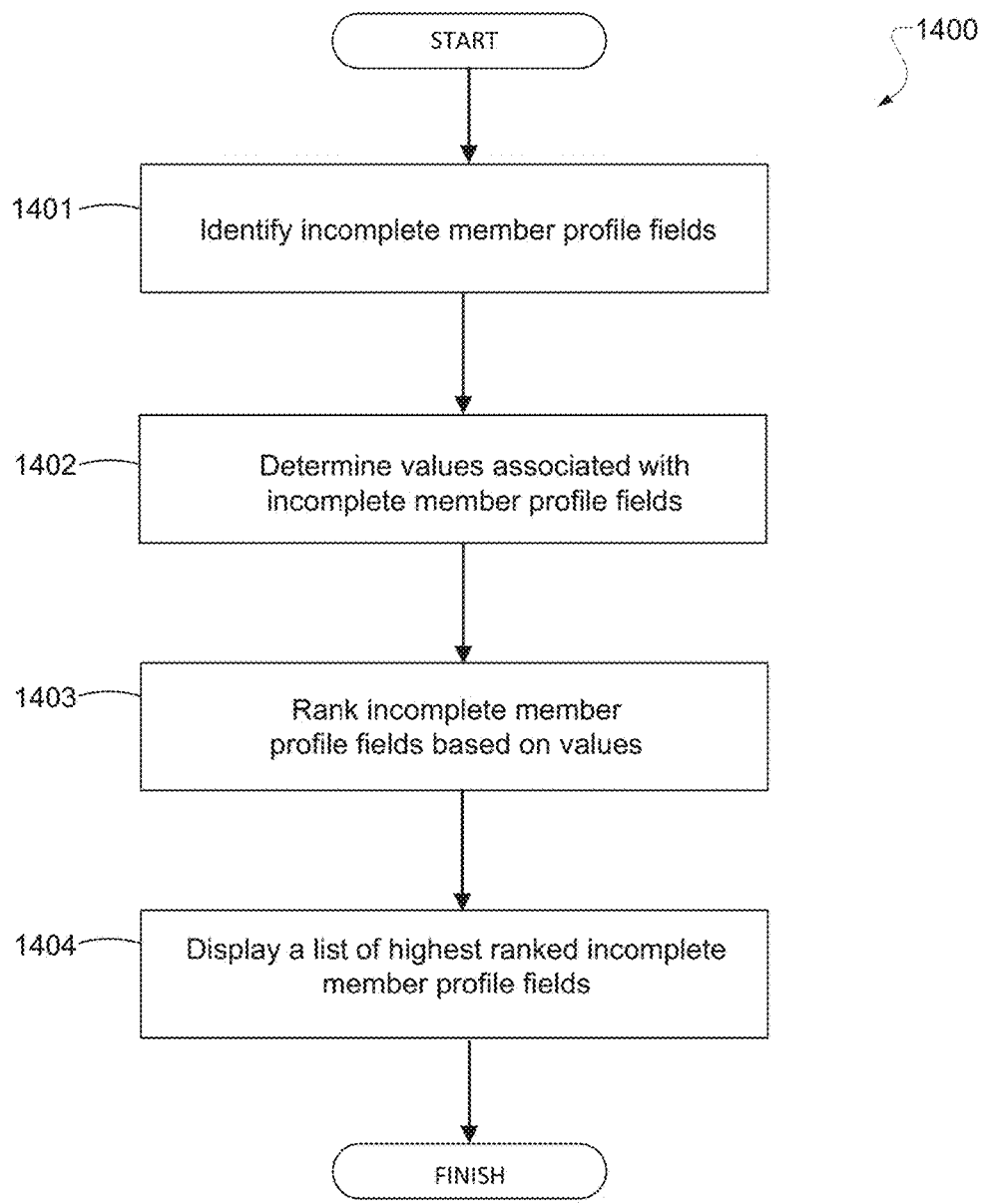
FIG. 14 is a flowchart illustrating an example method, according to various embodiments.

FIG. 14 is a flowchart illustrating an example method 1400, consistent with various embodiments described herein. The method 1400 may be performed at least in part by, for example, the guided edit system 200 illustrated in FIG. 2 (or an apparatus having similar modules, such as one or more client machines or application servers). In operation 1401, the determination module 202 identifies incomplete member profile fields in a member profile associated with member of an online social networking service. In operation 1402, the determination module 202 determines, based on accessed profile completion score criteria information, profile completion score weight values associated with the incomplete member profile fields in the member profile that were identified in operation 1401. In operation 1403, the determination module 202 ranks the incomplete member profile fields in the member profile, based on the profile completion score weight values associated with each of the incomplete member profile fields that were accessed in operation 1402. In some embodiments, the ranking in operation 1403 may include (a) determining segment-specific likelihood values associated with the incomplete member profile fields in the member profile (where the segment-specific likelihood values indicating a likelihood that members in a member segment will complete the incomplete member profile fields), (b) modifying the profile completion score weight value associated with each of the incomplete member profile fields based on the segment-specific likelihood value associated with each of the incomplete member profile fields (e.g., multiplying the profile completion score weight value and the segment-specific likelihood value associated with each of the incomplete member profile fields), to generate a modified profile completion score weight value associated with each of the incomplete member profile fields, and (c) ranking the incomplete member profile fields in the member profile, based on the modified profile completion score weight values associated with each of the incomplete member profile fields.

In operation 1404, the prompt module 204 displays, via a user interface, a list of one or more of the highest ranked incomplete member profile fields (that were ranked in operation 1403), together with a prompt recommending the member to complete the identified incomplete member profile fields. It is contemplated that the operations of method 1400 may incorporate any of the other features disclosed herein. Various operations in the method 1400 may be omitted or rearranged.

While various example embodiments herein describe optimizing the ordering of a list of profile edit tasks, the embodiments and techniques described herein are not limited merely to profile edit tasks, and are applicable to any type of task(s) to be performed.

Example Mobile Device

Figure 15:
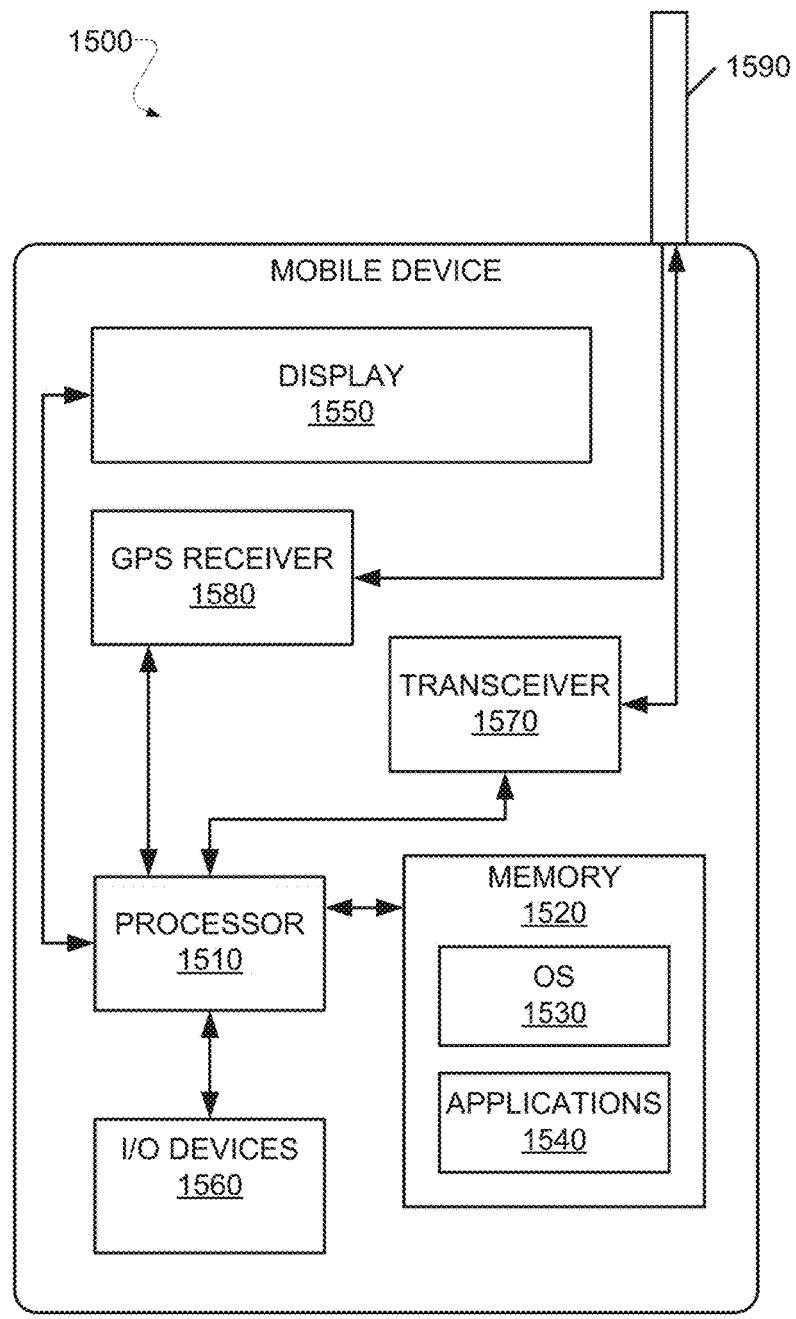
FIG. 15 illustrates an example mobile device, according to various embodiments.

FIG. 15 is a block diagram illustrating the mobile device 1500, according to an example embodiment. The mobile device may correspond to, for example, one or more client machines or application servers. One or more of the modules of the system 200 illustrated in FIG. 2 may be implemented on or executed by the mobile device 1500. The mobile device 1500 may include a processor 1510. The processor 1510 may be any of a variety of different types of commercially available processors suitable for mobile devices (for example, an XScale architecture microprocessor, a Microprocessor without Interlocked Pipeline Stages (MIPS) architecture processor, or another type of processor). A memory 1520, such as a Random Access Memory (RAM), a Flash memory, or other type of memory, is typically accessible to the processor 1510. The memory 1520 may be adapted to store an operating system (OS) 1530, as well as application programs 1540, such as a mobile location enabled application that may provide location based services to a user. The processor 1510 may be coupled, either directly or via appropriate intermediary hardware, to a display 1550 and to one or more input/output (I/O) devices 1560, such as a keypad, a touch panel sensor, a microphone, and the like. Similarly, in some embodiments, the processor 1510 may be coupled to a transceiver 1570 that interfaces with an antenna 1590. The transceiver 1570 may be configured to both transmit and receive cellular network signals, wireless data signals, or other types of signals via the antenna 1590, depending on the nature of the mobile device 1500. Further, in some configurations, a GPS receiver 1580 may also make use of the antenna 1590 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
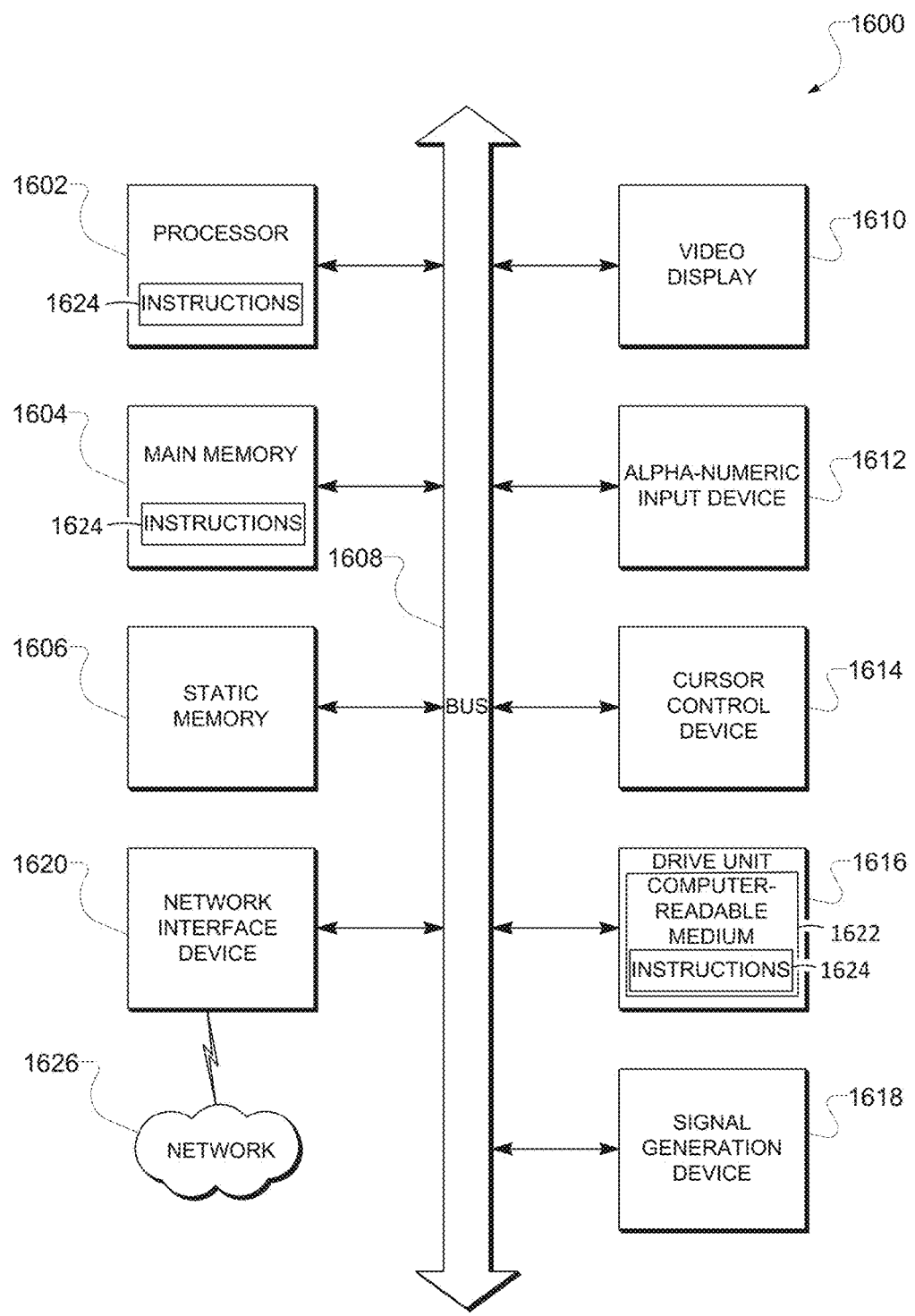
FIG. 16 is a diagrammatic representation of a machine in the example form of a computer system within which a set of instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a member profile associated with a first member of an online social networking service is incomplete;
   in response to determining that the member profile is incomplete:
   identifying a set of at least two incomplete member profile fields in the member profile associated with the first member of the online social networking service, and
   identifying, based on profile data included in the member profile, a member segment to which the first member belongs, the member segment including a set of other member profiles that share similar profile data as the profile data included in the member profile;

determining, using one or more hardware processors and based on historical response metrics of the set of other member profiles included in the member segment, profile completion score weight values associated with the at least two incomplete member profile fields in the member profile, each profile completion score weight value associated with one of the set of at least two incomplete member profile fields and indicating a likelihood that members from the member segment will successfully respond when prompted to provide the respective incomplete member profile field;

ranking the set of at least two incomplete member profile fields in the member profile based on their respective profile completion score weight values; and displaying, via a user interface, a list of one or more of the highest ranked incomplete member profile fields, together with a prompt recommending the member to complete the identified incomplete member profile fields.

2. The method of claim 1, wherein the historical response metrics correspond to historical completion rates for incomplete member profile fields by the set of other member profiles in the member segment.

3. The method of claim 1, wherein the member segment corresponds to active members or dormant members.

4. The method of claim 1, wherein the member segment corresponds to members having a historical log-in frequency of approximately once a day, once a week, once a month, or less than once a month.

5. The method of claim 1, wherein the profile completion score weight values are further determined based on a quantity of profile views received, a prominence of a member profile in search results, a quantity of messages received via a member profile, and a quantity of connection invitations received via a member profile.

6. The method of claim 1, wherein the profile completion score weight values are further determined based on a total quantity of page views performed at the online social networking service and a total quantity of advertisement clicks performed at the online social networking service.

7. The method of claim 1, wherein determining the profile completion score weight values comprises:

training an outcome-specific machine learned model configured to predict a value based on a given completion status for each of a plurality of member profile fields for a given member profile; and calculating the average of each of the outcome-specific machine learned models.

8. The method of claim 7, wherein the training of each outcome-specific machine learned model further comprises:

accessing a set of feature data associated with each of the plurality of members of the online social networking service, each set of feature data indicating a completion status for each of the plurality of member profile fields associated with the corresponding member; and training, based on the feature data, the corresponding outcome-specific machine learned model.

9. A system comprising:

one or more computer processors; and one or more computer-readable mediums storing instructions that, when executed by the one or more computer processors, cause the system to perform operations comprising:

determining that a member profile associated with a first member of an online social networking service is incomplete;

in response to determining that the member profile is incomplete:

identifying a set of at least two incomplete member profile fields in the member profile associated with the first member of the online social networking service, and identifying, based on profile data included in the member profile, a member segment to which the first member belongs, the member segment including a set of other member profiles that share similar profile data as the profile data included in the member profile;

determining, based on historical response metrics of the set of other member profiles included in the member segment, profile completion score weight values associated with the at least two incomplete member profile fields in the member profile, each profile completion score weight value associated with one of the set of at least two incomplete member profile fields and indicating a likelihood that members from the member segment will successfully respond when prompted to provide the respective incomplete member profile field;

ranking the set of at least two incomplete member profile fields in the member profile based on their respective profile completion score weight values; and displaying, via a user interface, a list of one or more of the highest ranked incomplete member profile fields, together with a prompt recommending the member to complete the identified incomplete member profile fields.

10. The system of claim 9, wherein the historical response metrics correspond to historical completion rates for incomplete member profile fields by the set of other member profiles in the member segment.

11. The system of claim 9, wherein the member segment corresponds to active members or dormant members.

12. The system of claim 9, wherein the member segment corresponds to members having a historical log-in frequency of approximately once a day, once a week, once a month, or less than once a month.

13. The system of claim 9, wherein the profile completion score weight values are further determined based on a quantity of profile views received, a prominence of a member profile in search results, a quantity of messages received via a member profile, and a quantity of connection invitations received via a member profile.

14. The system of claim 9, wherein the profile completion score weight values are further determined based on a total quantity of page views performed at the online social networking service and a total quantity of advertisement clicks performed at the online social networking service.

15. A non-transitory computer-readable medium storing instructions that, when executed by one or more computer processors, cause the one or more computer processors to perform operations comprising:

determining that a member profile associated with a first member of an online social networking service is incomplete;

in response to determining that the member profile is incomplete:

identifying a set of at least two incomplete member profile fields in the member profile associated with the first member of the online social networking service, and identifying, based on profile data included in the member profile, a member segment to which the first member belongs, the member segment including a set of other member profiles that share similar profile data as the profile data included in the member profile;

determining, based on historical response metrics of the set of other member profiles included in the member segment, profile completion score weight values associated with the at least two incomplete member profile fields in the member profile, each profile completion score weight value associated with one of the set of at least two incomplete member profile fields and indicating a likelihood that members from the member segment will successfully respond when prompted to provide the respective incomplete member profile field;

ranking the set of at least two incomplete member profile fields in the member profile based on their respective profile completion score weight values; and displaying, via a user interface, a list of one or more of the highest ranked incomplete member profile fields, together with a prompt recommending the member to complete the identified incomplete member profile fields.

16. The non-transitory computer-readable medium of claim 15, wherein the member segment corresponds to members having a historical log-in frequency of approximately once a day, once a week, once a month, or less than once a month.

17. The non-transitory computer-readable medium of claim 15, wherein the profile completion score weight values are further determined based on a quantity of profile views received, a prominence of a member profile in search results, a quantity of messages received via a member profile, and a quantity of connection invitations received via a member profile.

18. The non-transitory computer-readable medium of claim 15, wherein the profile completion score weight values are further determined based on a total quantity of page views performed at the online social networking service and a total quantity of advertisement clicks performed at the online social networking service.

19. The non-transitory computer-readable medium of claim 15, wherein determining the profile completion score weight values comprises:

training an outcome-specific machine learned model configured to predict a value based on a given completion status for each of a plurality of member profile fields for a given member profile; and calculating the average of each of the outcome-specific machine learned models.

20. The non-transitory computer-readable medium of claim 19, wherein the training of each outcome-specific machine learned model further comprises:

accessing a set of feature data associated with each of the plurality of members of the online social networking service, each set of feature data indicating a completion status for each of the plurality of member profile fields associated with the corresponding member; and training, based on the feature data, the corresponding outcome-specific machine learned model.

* * * * *